UNITED STATES PATENT OFFICE.

CHARLES BURROWS MOREY AND CHARLES ROLLIN CRAINE, OF BUFFALO, NEW YORK, ASSIGNORS TO LARKIN COMPANY, OF BUFFALO, NEW YORK.

METHOD OF MAKING CATALYTIC MATERIAL.

1,232,830. Specification of Letters Patent. Patented July 10, 1917.

No Drawing. Application filed February 2, 1916. Serial No. 75,669.

*To all whom it may concern:*

Be it known that we, CHARLES BURROWS MOREY and CHARLES ROLLIN CRAINE, citizens of the United States, residing at Buffalo, in the county of Erie and State of New York, have invented a new and useful Improvement in Methods of Making Catalytic Material, of which the following is a specification.

This invention relates to methods of making catalytic material, such as is used in the hydrogenation of fats, oils or the like, and more particularly to processes of mechanically combining an active catalytic agent with or depositing the same on a substance which has no catalytic action.

Some of the processes heretofore used for forming composite catalyzers of this kind have produced catalyzers in which the active catalytic agent does not always adhere securely to the inert substance so that small particles of the active agent break off or become detached from the inert substance. These particles are so small that it is extremely difficult, if not impossible, to remove the same from the hydrogenized product by filtration, and the presence of these particles in the product is objectionable.

The object of the invention is to devise an improved process of this kind for producing catalytic material of superior quality in which the active catalytic agent is caused to penetrate and adhere securely to the inactive substance.

In carrying out this process, a hydroxid of the catalytic agent or metal is preferably employed and may be prepared in any suitable manner. Nickel is preferably, though not necessarily, used for this purpose, and the nickel hydroxid may, for example, be prepared by adding sodium carbonate to a solution of soluble nickel salt, and then washing out the soluble products of the reaction. The freshly prepared hydroxid of the catalytic agent is mixed with sufficient water to form a practically uniform suspension.

The inert substance, which may be fullers' earth, infusorial earth, or other suitable body, is heated, preferably to a temperature greater than the boiling point of water, for the purpose of driving off moisture or gases which may be contained in the inert substance. The inert substance, while hot, is mixed with the prepared suspension of hydroxid of the catalytic agent or metal in water, and in the cooling of the inert substance the hydroxid of the catalytic agent is drawn into intimate contact with and impregnates and coats the inert substance. If desired the forcing of the hydroxid of the catalytic agent into the inert substance may be further assisted by subjecting the mixture alternately to vacuum and to atmospheric or higher pressure, but this last step is not essential to the process and may be omitted, since the mixing of the hot inert substance with the catalytic compound insures a secure bond between the hydroxid of the catalytic agent and the inert substance. The mixture thus formed is then dried and comminuted if desired, and the hydroxid of the catalytic material is reduced by hydrogen or in any other suitable manner.

The following example illustrates how the process may be carried out:

60 parts by weight of nickel sulfate are dissolved in water and nickel hydroxid is precipitated from the solution with soda ash. The precipitated nickel hydroxid is boiled, filtered and then washed with water to remove the soluble products of reaction. The nickel hydroxid is then mixed with a small amount of water to form a thick suspension and 25 parts by weight of fullers' earth, heated to about 400° F., is mixed while still hot with the suspension. The resulting mixture is then dried, and when thoroughly dry, it is preferably comminuted and the powder is reduced with hydrogen.

By means of the process described the hydroxid of the catalytic material is forced into intimate contact with the inert material. This is due to the fact that inert substances, such as fullers' earth, have considerable capacity for absorption, and by heating the substance the matter absorbed by the inert substance, such as gases and moisture, is driven off, and when the substance is cooled by mixing it with the suspension, the hydroxid in the suspension takes the place of the matter driven off, so that the hydroxid of the catalytic agent enters into intimate contact with the particles of inert substance. In this catalyzer there is consequently a firm mechanical union or bond between the active catalytic agent and the inert substance, so that the tendency of small particles of the catalytic agent to break off from the inert substance is greatly reduced, if not entirely eliminated. The filtering of the hydrogenized product is therefore greatly facilitated and the quality of the product is also improved. The action of the vacuum on the mixture is somewhat similar to the action of heating the inert substance, since it removes the gas absorbed by the substance, and when the mixture is then subjected to pressure, the suspension takes the place of the gas removed from the substance. The absorptive capacity of the inert material is thus exerted upon the suspension instead of on the gases formerly held thereby, so that a very secure bond between the inert substance and the catalytic agent is insured.

In place of driving off the gases and moisture absorbed by the inert substance by means of heat, the following alternative method may be employed:

The inert substance is mixed without heating the same, with the suspension of hydroxid of the catalytic agent in water, as heretofore described, and the resulting mixture is subjected alternately to vacuum and to atmospheric or higher pressure. It is found that the catalytic agent will enter into a close mechanical union with the inert substance when treated in this manner. The mixture is then dried, comminuted, and reduced as hereinbefore described.

In the method described the production of the catalyzer is facilitated by preparing the hydroxid suspension before mixing the catalytic agent with the inert substance. In this way the products of the reaction which results in forming the hydroxid can be more easily washed out of the mass, than would be the case if the inert substance were mixed with the mass before washing. A better adhesion of the catalytic agent on the inert material is also obtained in this manner since the inert material can absorb none of the undesirable products of the reaction.

It will be understood that although the hydroxid of the catalytic agent is preferably used and has been found to give the most satisfactory results, it is not intended to limit the invention to the use of the hydroxid of the catalytic agent, since any other compound of the catalytic agent which is insoluble in water may be used.

We claim as our invention:

1. The method of producing a catalyzer consisting of mixing an absorptive non-catalytic material with an insoluble compound of a catalytic agent, removing from the interstices of said absorptive material the moisture and gases contained therein and causing said compound to enter into said interstices to form a secure bond between the same and said compound, drying the mixture and reducing the same.

2. The method of producing a catalyzer consisting of forming a suspension in a liquid of an insoluble compound of a catalytic agent, mixing an absorptive non-catalytic material with said suspension, removing from the interstices of said absorptive material the moisture and gases contained therein and causing said compound to enter into said interstices to form a secure mechanical bond between the same and said compound, drying and reducing the same.

3. The method of producing a catalyzer consisting of heating an absorptive non-catalytic material to a temperature sufficient to drive off moisture and gases contained therein and not sufficient to fuse said material, mixing the same with wet hydroxid of a catalytic agent, drying the mixture and reducing the same.

4. The method of producing a catalyzer consisting of forming a suspension in water of an insoluble compound of a catalytic agent, heating an absorptive, inert material to a temperature sufficient to drive off moisture and gases contained therein and not sufficient to fuse said material, and mixing the same with said suspension, drying the mixture and reducing the same.

5. The method of producing a catalyzer consisting of suspending an insoluble nickel compound in a liquid, mixing fullers' earth with said suspension, removing from the interstices of said fullers' earth the moisture and gases contained therein and causing said compound to enter into said interstices to form a secure mechanical bond between the same and said nickel compound, drying, comminuting, and reducing the mixture.

6. The method of producing a catalyzer consisting of heating a quantity of fullers' earth to a temperature sufficient to drive off moisture and gases contained therein and not sufficient to fuse said material, suspending nickel hydroxid in a liquid, mixing said fullers' earth while hot with said suspension, drying, comminuting and reducing the mixture.

7. The method of producing a catalyzer consisting of suspending nickel hydroxid in water to form a thick suspension, mixing fullers' earth at a temperature of about 400° F. with said suspension, drying, and reducing the mixture.

8. The method of producing a catalyzer consisting of heating an absorptive non-catalytic material to a temperature sufficient to drive off moisture and gases contained therein and not sufficient to fuse said material, mixing the same with a suspension of a compound of a catalytic agent, subjecting the mixture alternately to vacuum and pressure, drying and comminuting the mixture and reducing the same.

9. The method of producing a catalyzer consisting of forming a suspension in water of an insoluble compound of a catalytic agent, heating an absorptive, inert material to a temperature of approximately 400° F. and mixing the same with said suspension, subjecting the mixture alternately to vacuum and pressure, drying and comminuting the mixture and reducing the same.

10. The method of producing a catalyzer consisting of forming a suspension of nickel hydroxid in a liquid, heating a quantity of fullers' earth to a temperature sufficient to drive off moisture and gases contained therein and not sufficient to fuse said material and mixing the same while hot with said suspension, subjecting the mixture alternately to vacuum and pressure, and then drying, comminuting and reducing the mixture.

11. The method of producing a catalyzer consisting of mixing an absorptive non-catalytic material with an insoluble compound of a catalytic agent, subjecting the mixture alternately to vacuum and pressure to cause said compound to enter into the interstices of the absorptive material to form a secure bond between the same and said compound, drying the mixture and reducing the same.

Witness our hands, this 29th day of January, 1916.

CHARLES BURROWS MOREY.
CHARLES ROLLIN CRAINE.

Witnesses:
  E. D. HUNTLEY,
  JOHN H. HICKES.